United States Patent
Silvy et al.

(10) Patent No.: US 7,754,181 B2
(45) Date of Patent: Jul. 13, 2010

(54) METHOD OF SYNTHESISING A SUPPORT CATALYST FOR THE PRODUCTION OF CARBON NANOTUBES

(75) Inventors: Ricardo Prada Silvy, Norman, OK (US); Fanny Liegeois, Vedrin (BE); Benedicte Culot, Jemeppe-sur-Sambre (BE); Stéphanie Lambert, Berloz (BE)

(73) Assignee: Nanocyl S.A. (BE)

( * ) Notice: Subject to any disclaimer, the term of this patent is extended or adjusted under 35 U.S.C. 154(b) by 0 days.

(21) Appl. No.: 11/791,309

(22) PCT Filed: Dec. 9, 2005

(86) PCT No.: PCT/BE2005/000182

§ 371 (c)(1),
(2), (4) Date: Mar. 3, 2008

(87) PCT Pub. No.: WO2006/079186

PCT Pub. Date: Aug. 3, 2006

(65) Prior Publication Data

US 2008/0213160 A1  Sep. 4, 2008

(30) Foreign Application Priority Data

Dec. 23, 2004  (EP)  .................. 04447291

(51) Int. Cl.
*D01F 9/12* (2006.01)
*D01F 9/127* (2006.01)
*B01J 23/74* (2006.01)

(52) U.S. Cl. .............. 423/447.1; 423/447.3; 423/447.7; 502/336; 977/843

(58) Field of Classification Search .................. 502/325, 502/332, 336; 423/447.1
See application file for complete search history.

(56) References Cited

U.S. PATENT DOCUMENTS

| | | | | |
|---|---|---|---|---|
| 7,250,148 B2 * | 7/2007 | Yang et al. | ............... | 423/447.3 |
| 7,288,182 B1 * | 10/2007 | Soled et al. | ................ | 208/112 |
| 7,341,976 B2 * | 3/2008 | Espinoza et al. | ........... | 502/327 |
| 2003/0064020 A1 * | 4/2003 | Kogoi et al. | ............... | 423/625 |
| 2003/0187293 A1 * | 10/2003 | Birke et al. | ............... | 560/241 |
| 2004/0241080 A1 * | 12/2004 | Nagy et al. | .............. | 423/447.3 |
| 2004/0253374 A1 * | 12/2004 | Jung et al. | ................ | 427/213 |

FOREIGN PATENT DOCUMENTS

WO  WO 03/004410  1/2003

OTHER PUBLICATIONS

Hojin Ryu et al., "Effect of Mechanochemical Treatment of Supported Catalysts on the CVD Growth of Carbon Nanomaterials", Electronics Packaging Technology Conference, 2002. 4th Dec. 10-12, 2002, Piscataway, NJ, USA, IEEE, Dec. 10, 2002, pp. 76-78, XP010635020 ISBN: 0-7803-7435-5.

\* cited by examiner

*Primary Examiner*—Jerry Lorengo
*Assistant Examiner*—Joseph V Micali
(74) *Attorney, Agent, or Firm*—Reinhart Boerner Van Deuren p.c.

(57) ABSTRACT

The present invention relates to a method for synthesising a catalyst with a view to the production of multi-wall nanotubes comprising the following stages:
  mixing an $Al(OH)_3$ powder having a particle size lower than 80 μm with an aqueous solution of an iron and cobalt salt, the whole forming a paste;
  drying said paste until a powder with a moisture level lower than 5% by weight is obtained;
  selecting the particle-size fraction that is lower than 70 μm.

19 Claims, 3 Drawing Sheets

METHOD OF SYNTHESISING A SUPPORT CATALYST FOR THE PRODUCTION OF CARBON NANOTUBES

CROSS-REFERENCE TO RELATED PATENT APPLICATIONS

This patent application is the National Stage of International Application No. PCT/BE2005/000182 filed Dec. 9, 2005, that claims the benefit of European Application No. 04447291.8 filed Dec. 23, 2004.

FIELD OF THE INVENTION

The present invention relates to a method for synthesising a supported catalyst with a view to the production of carbon nanotubes, as well as to the use of that catalyst in a method for producing multi-wall carbon nanotubes with increased yield and selectivity.

STATE OF THE ART

Since the invention of carbon nanotubes at the beginning of the 90's, there has been a constant increase in the number of their applications. Only the very high production cost of this material limits its use in many areas.

In recent years, research effort has thus been directed towards the selection of the most suitable catalysts. With the route of supported catalysts having proved particularly promising, studies have been more particularly directed towards the different supports combined with active catalytic sites, as well as towards their effect on the selectivity and yield obtained.

Document WO-03/004410 A1 discloses a whole series of catalytic supports for the production of single and multi-wall carbon nanotubes. The various catalytic supports in this document are essentially tested for their selectivity, i.e. their tendency to form single or double-wall carbon nanotubes relative to a specific proportion of amorphous carbon or of carbon fibres. This selectivity has been studied within relatively wide temperature ranges, varying from 400 to 1,100° C., and the yields of carbon deposits vary between 200 and 500% for reaction times of about 60 minutes. This research allowed to select the most promising among several combinations of support/catalytic site, without as such precisely disclosing the parameters allowing to improve yield and selectivity, and hence productivity.

A yield of 200% means a consumption of 100 g of catalyst in order to produce 200 g of carbon deposits. Large proportions of unwanted, amorphous carbon and carbon fibres are found within the deposited carbon, the whole being mixed together with the consumed catalyst. In general, this contamination therefore requires a purification stage that further adds to the manufacturing costs. The yield of marketable nanotubes thus quickly drops, which immediately affects the cost price. To date, the methods for producing carbon nanotubes have essentially been studied in the laboratory on a scale that is rarely transferable to a semi-industrial scale.

The production of carbon nanotubes on a semi-industrial scale therefore required both yield optimisation and process selectivity.

A reduced consumption of catalyst besides allows to use more expensive catalytic supports. Moreover, a better selectivity allows many applications to dispense with the purification stage that has almost always been necessary to date.

AIMS OF THE INVENTION

The present invention aims to provide a method for synthesising a supported catalyst that would allow to achieve greater selectivity and yield than those obtained in the state of the art, and to do all this in a much shorter reaction time. The whole process would contribute to a considerable increase in productivity and to a significant reduction of the manufacturing costs of multi-wall carbon nanotubes.

The present invention also aims to provide a method for producing multi-wall carbon nanotubes from the new catalyst, that is suitable for producing carbon deposits mainly comprising nanotubes, and in particular multi-wall carbon nanotubes, with a much more homogeneous distribution of walls than with the prior art.

Characteristic Elements of the Invention

The present invention discloses a method for synthesising a catalyst with a view to the production of multi-wall nanotubes comprising the following stages:

mixing an $Al(OH)_3$ powder having a particle size lower than 80 μm with an aqueous solution of an iron and cobalt salt, the whole forming a paste;

drying said paste until a powder having a moisture level lower than 5% by weight is obtained;

selecting the particle-size fraction that is lower than 70 μm.

According to particular embodiments, the invention comprises one or several of the following features:

the $Al(OH)_3$ powder is chosen at the start with a particle size lower than 70 μm and a specific surface area lower than 10 $m^2/g$;

the $Al(OH)_3$ powder is chosen from gibbsite or bayerite;

the $Al(OH)_3$ powder is bayerite;

the aqueous solution of said iron and cobalt salt is a solution of $Fe(NO_3)_3$ and $Co(OAc)_2$;

the $Fe(NO_3)_3$ and $Co(OAc)_2$ have a purity between 95 and 99%;

the drying stage is carried out in a ring dryer;

the stage of selecting the particle-size fraction is preceded by a milling stage;

said selection is performed by sieving;

the mixing, drying and selection stages are carried out simultaneously;

an additional milling and selection stage precedes the mixing stage.

The present invention also discloses a method for producing multi-wall nanotubes from the catalyst obtained by the method of Claim 1 comprising the following successive stages:

prior treatment of said catalyst at a temperature of about 700° C. in an oven;

putting said catalyst in the presence of a flow of pure methane and/or ethylene at a temperature between 650 and 750° C. for 15 to 25 minutes in the oven.

Lastly, the invention discloses the use of the catalyst as in Claim 1 for producing single and multi-wall carbon nanotubes.

DETAILED DESCRIPTION OF THE INVENTION

Figure 1:
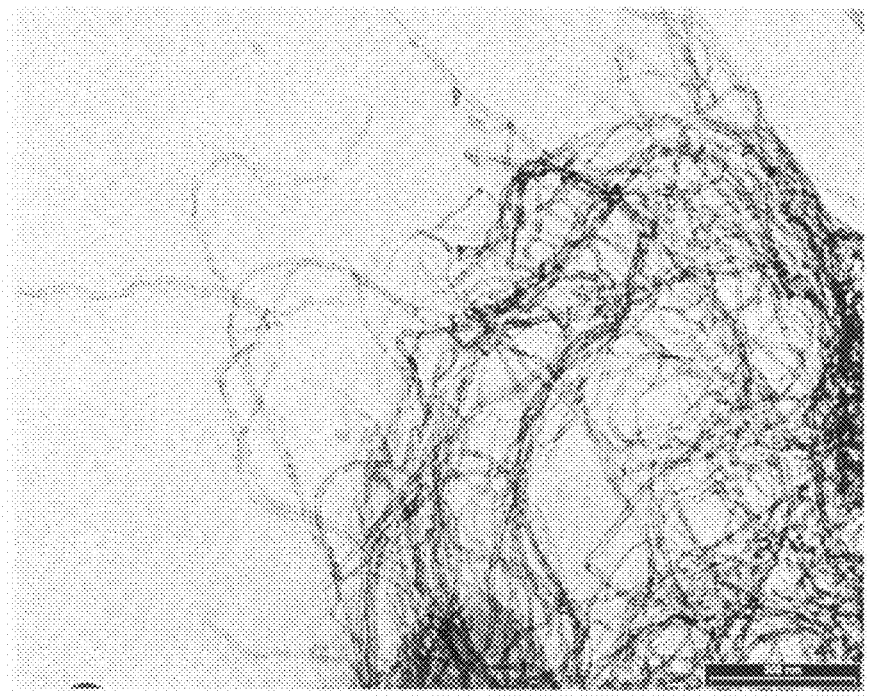
FIG. 1 shows nanotubes synthesised with a catalyst having a particle size lower than 63 μm.

The inventor started with the most promising combinations of support/catalytic site disclosed in document WO-03/004410 A1. In the course of the following description, the word "catalyst" will be understood as the catalytic support provided with its catalytic site.

The first tests to synthesise multi-wall carbon nanotubes were carried out with catalytic compositions of acetylene on a cobalt/iron catalyst supported by alumina. In the prior art, the acetylene is made to react with the catalyst for about 60 minutes and a product with a carbon content of about 80% is obtained. The obtained nanotubes are of good quality despite a relatively large distribution of diameters and a significant presence of amorphous carbon.

During tests to improve the method for producing nanotubes, the acetylene was replaced by ethylene or methane, which are easier to handle for safety reasons.

The following parameters were then systematically tested:
the temperature of the oven for working with ethylene;
the time required for the synthesis (optimum period)
the flow rate of hydrocarbon;
the concentration of ethylene in the gaseous flow.

With regard to the percentage of carbon obtained as a function of the temperature in the oven, an optimum quantity of carbon nanotubes is obtained within a range between 650 and 750° C., and preferably in the region of 700° C.

In a second step, the synthesis time required to obtain nanotubes was tested. Obviously, the longer the synthesis time, the higher the percentage of carbon in the sample. However, the longer this synthesis time, the more the carbon nanotubes cluster in bundles and the more the proportion of large nanotubes grows; these effects are undesirable. Moreover, the shortest possible reaction time for the synthesis is clearly advantageous. A threshold is reached at about 20 to 25 minutes of reaction time, which allows to retain 80% of the carbon in the samples whilst at the same time significantly reducing the reaction time, which is of course interesting with regard to the desired increase in productivity.

In addition, the concentration of ethylene in the gaseous flow was tested as a variable. Table 1 shows the percentage of carbon in the sample as a function of the ethylene content in the gaseous flow. It is easily noted that the best results are obtained with pure ethylene.

Following this experiment, the flow rate of ethylene in terms of litres/minute was tested at 700° C. and for 20 minutes. An ethylene flow rate of 2 l/min. is sufficient to reach a threshold of carbon production. However, the inventor chose an ethylene flow rate of 4 l/min. to prevent the formation of unwanted polyaromatics during synthesis. The inventor experimentally noted that these were generated at a flow rate lower than 3 l/min.

The optimum conditions that could thus be determined for the use of a cobalt/iron catalyst supported on alumina are therefore a reaction time of about 20 min. under a flow rate of pure ethylene of about 4 l/min. at a temperature of about 700° C. and for an oven of a given volume. These conditions were thus selected for the development of an optimised supported catalyst (Table 1). The goal sought is to improve the yield and selectivity so that the production of multi-wall carbon nanotubes is brought to a semi-industrial scale.

TABLE 1

Effect of the synthesis conditions on the percentages of carbon obtained

| | Temperature | | | | |
|---|---|---|---|---|---|
| | 600° C. | 650° C. | 700° C. | 750° C. | 800° C. |
| % of carbon | 47 | 61 | 78 | 76 | 74 |
| Synthesis time | 10 min. | 20 min. | 40 min. | 60 min. | 80 min. |
| % of carbon | 73 | 78 | 86 | 87 | 90 |
| Level of $C_2H_4$ | 20% | 40% | 60% | 80% | 100% |
| % of carbon | 55 | 61 | 71 | 76 | 78 |
| $C_2H_4$ flow rate | 1 l/min. | 2 l/min. | 3 l/min. | 4 l/min. | |
| % of carbon | 56 | 73 | 77 | 78 | |

The present invention aims to provide a method for preparing a supported catalyst used for the synthesis of multi-wall carbon nanotubes. This new method of preparation allows to achieve selectivity and yield higher than those obtained in the prior art. The improved productivity is expressed in terms of quantity by the volume of nanotubes formed per weight of consumed catalyst.

The contact time is represented by the ratio between the mass of catalyst (M) and the molar flow of the reagent molecules (F). A very brief contact time between the molecules of reagent ($CH_4$/$C_2H_4$) and the catalyst prevents the formation of other, unwanted carbon compounds which are mainly amorphous carbon and carbon fibres. This is confirmed by the analyses obtained by electron microscopy of the samples obtained after 1 hr of synthesis and 0.33 hrs of synthesis. The result is shown in Table 2.

TABLE 2

| Method for preparing the catalyst | Nanotube yield (%) | Mol C (nanotube)/ mol C ($C_2H_4$) | Synthesis time (hr) | Contact time (M/F) (gcat · h/ mol ($C_2H_4$) | Quality of carbon NTMP/MA |
|---|---|---|---|---|---|
| Prior art WO-03/004410 | 252 | 0.87 | 1 | 8.3 | +++/-- |
| Prior art WO-03/004410 | 390 | 0.16 | 0.33 | 0.9 | +++/--- |

TABLE 2-continued

| Method for preparing the catalyst | Nanotube yield (%) | Mol C (nanotube)/ mol C (C₂H₄) | Synthesis time (hr) | Contact time (M/F) (gcat · h/ mol (C₂H₄) | Quality of carbon NTMP/MA |
|---|---|---|---|---|---|
| FeCo/Al(OH)₃ prepared as in the invention | 1,033 | 0.40 | 0.33 | 0.9 | +++/--- |

NTMP: multi-wall nanotube,
+++ = high density,
-- low density,
--- not observed.
MA: amorphous material Preparation of the Catalyst as in the Invention The method for synthesising the catalyst as in the invention generally comprises the following stages:
- selecting a support based on aluminium hydroxide (Al(OH)₃) with a particle size lower than 80 μm, a specific surface area and a porous volume lower than 20 m²/g and 0.5 cc/g respectively, as well as a moisture level lower than 5% by weight. The loss of weight measured by ignition of the aluminium hydroxide varies between 30 and 36%;
- milling and sieving the Al(OH)₃ powder to a particle size lower than 70 μm;
- impregnating the small particles in a mixer with an aqueous solution of a soluble iron and cobalt salt having a chemical composition between 2% and 10% by total weight of the metals in the final catalyst. The atomic ratio (Co/Fe+Co) varies between 0.2 and 0.8. The iron and cobalt salts normally used for the preparation of the catalyst are Fe(NO₃)₃ and Co(CH₃COO)₂ with a purity between 95.0 and 99.5% by weight;
- the ratio of solution volume/support weight varies between 0.2 and 0.5 cc/g;
- the time for mixing the paste formed by contact between the solution and the solid varies between 5 and 25 minutes;
- the drying operation is carried out in an oven at a temperature between 25° C. and 120° C. in the presence of an air flow for 2 to 4 hours, or alternatively in a ring dryer or by lyophilisation;
- before the nanotube-synthesis stage, the catalyst is subjected to a treatment in the synthesis reactor at 700° C. in the presence of a nitrogen flow between 60 and 240 l/h for 10 to 15 minutes in order to preform the activated phases which will remain thermodynamically stable during synthesis;
- the synthesis of multi-wall carbon nanotubes is performed at a temperature between 650° C. and 750° C. with a flow rate of ethylene between 180 and 240 l/h and a contact time (M/F) between 0.9 and 1.1 g.h/mol C₂H₄ for 15 to 25 minutes of total synthesis time.

The following examples illustrate the preferred embodiments of the present invention.

Example 1

Effect of Particle Sizes on Carbon Yield

An Fe—Co/Al(OH)₃ catalyst was prepared according to the above-described procedure. The aluminium hydroxide used shows the following distribution of particle sizes:

| Particle size (μm) | % distribution |
|---|---|
| >63 | 48 |
| 20-63 | 44 |
| <20 | 8 |

The impregnated solid obtained after the drying stage was nevertheless milled and sieved to different particle sizes. Three different fractions were obtained:
I. Particles with a size lower than 20 μm
II. Particles with a size lower than 63 μm and
III. Particles with a size greater than 63 μm.

The carbon nanotube yield was estimated on the basis of the following equation:

$$\text{Yield}(\%) = \frac{(\text{weight of gross product}) - (\text{actual weight of catalyst})}{(\text{actual weight of catalyst})} \cdot 100$$

where the weight of the gross product represents the weight of the product obtained upon exit from the reactor, i.e. the weight of carbon nanotubes and the weight of catalyst. The actual weight of the catalyst represents the weight of the catalyst deposited in the reactor from which the loss of weight of the catalyst resulting from its loss of water caused by the increase in temperature is deducted. Indeed, the Fe—Co/Al(OH)₃ catalyst loses about 30-36% of its weight when it is heated to 700° C. for 10 minutes under nitrogen.

FIG. 1 shows carbon nanotubes synthesised on a catalyst particle size of <63 μm.

However, the weight fraction recovered after sieving is very low. Indeed, when analysing the particle size of the Fe—Co/Al(OH)₃ catalyst by light diffraction (Malyern), only 50% of the particles have a size lower than 80 μm.

Figure 2:
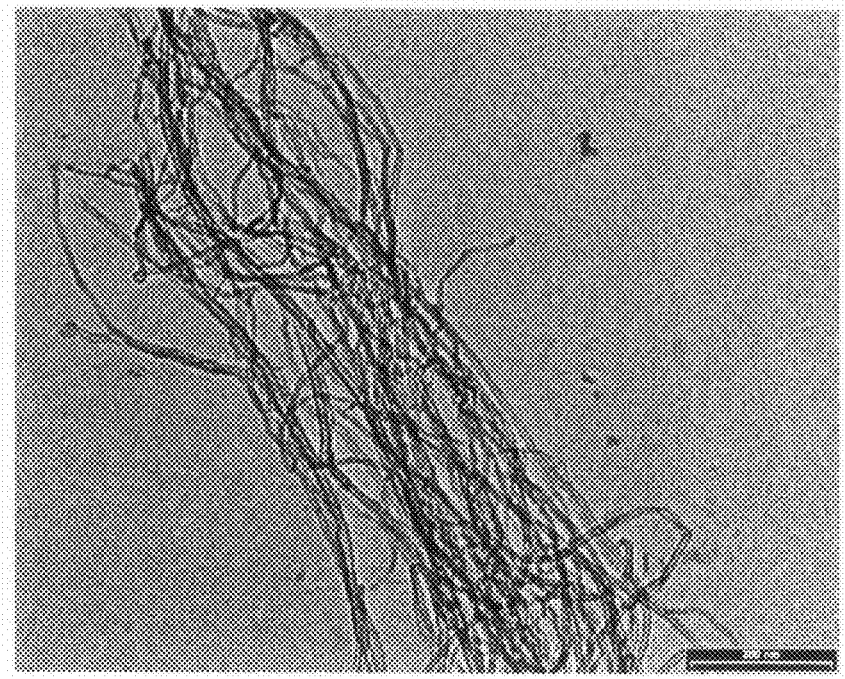
FIG. 2 shows nanotubes synthesised on a catalyst of a size smaller than 20 μm.
Figure 3:
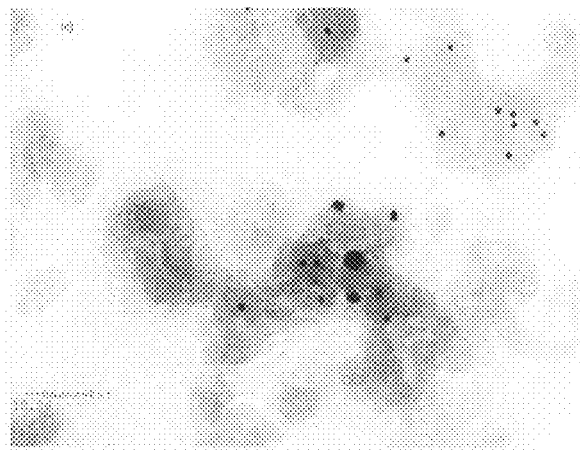
FIG. 3 shows a transmission electron microscopy of alumina with its catalytic sites in black on a grey background.
Figure 4:
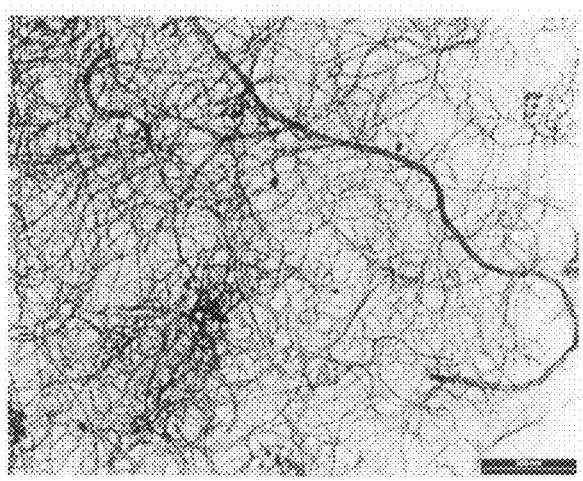
FIG. 4 shows a photo of nanotubes synthesised on an Fe—Co/$Al_2O_3$ catalyst dried in an oven at 120° C.

FIG. 2 shows carbon nanotubes synthesised on a catalyst particle size <20 μm.

Table 3 shows the results of carbon nanotube synthesis as a function of the particle size of the catalyst. The experimental conditions used are the following:
- flow rate of C₂H₄: 240 l/h
- synthesis time: 0.33 h
- temperature: 700° C.
- contact time of C₂H₄ (M/F): 0.4 g.h/mol It is observed that the yield of carbon nanotubes and the molar ratio between the nanotube formed per atom of C in C₂H₄ progressively increase as the size of catalyst particles decreases.

TABLE 3

Results of the carbon nanotube synthesis as a function of the particle size of the catalyst

| | Size of the particles | | | |
|---|---|---|---|---|
| | <20 μm | 0-63 μm | >63 μm | All sizes |
| % yield of nanotubes | 790 | 610 | 395 | 390 |
| mol C (nanotube)/mol C ($C_2H_4$) | 0.13 | 0.09 | 0.07 | 0.07 |
| Relative yield | 2.0 | 1.5 | 1.0 | 1.0 |

It is therefore possible to reduce the size of the catalyst particles for example by using a rotary mill. The following conditions were applied:

milling the catalyst at 200 rpm for 5 minutes with 15 balls of $ZrO_2$. 50% of the particles have a size lower than 45 μm;

milling the catalyst at 200 rpm for 60 minutes with 15 balls of $ZrO_2$. 50% of the particles have a size lower than 10 μm;

milling the catalyst at 250 rpm for 60 minutes with 15 balls of $ZrO_2$. 50% of the particles have a size lower than 10 μm.

Example 2

Effect of the Aluminium Hydroxide Type

The effect of the type of aluminium hydroxide used as a support for the catalyst was studied. It is known from the scientific literature that aluminium ions in solution may be precipitated with different forms of hydroxide ($Al(OH)_3$, γ-AlOOH and amorphous precipitates) depending on the pH, temperature and maturation time.

Amorphous precipitates are formed at a pH value between 4.0 and 6.0, boehmite (γ-AlOOH) between 6.5 and 8.0, gibbsite and bayerite ($Al(OH)_3$) between 8.5 and 10.5 and hydrargillite at pH between 10.5 and 12.0. Table 4 shows the results obtained in the synthesis of multi-wall carbon nanotubes with a series of Co—Fe catalysts supported on different types of aluminium hydroxide. It can be noted that bayerite provides more active catalysts than gibbsite and boehmite.

TABLE 4

Effect of the support on the activity of the catalysts for synthesising carbon nanotubes

| Catalyst | Yield of carbon (%) |
|---|---|
| Co—Fe/Bayerite | 758 |
| Co—Fe/Gibbsite | 177 |
| Co—Fe/Boehmite | 140 |
| Co—Fe/Bayerite calcined at 700° C. | 296 |
| Co—Fe/Gibbsite calcined at 700° C. | 133 |
| Co—Fe/Boehmite calcined at 700° C. | 283 |

These aluminium hydroxides transform into γ-alumina after calcination at 700° C. The specific surface area of the support increases from <10 $m^2/g$ to 210 $m^2/g$ for bayerite and to 177 $m^2/g$ for gibbsite.

A series of Fe—Co catalysts were prepared from calcined supports. Table 4 shows that calcination of the support causes a loss of catalytic properties. This shows that the basicity of the surface plays an important part in the development of improved catalysts for the synthesis of multi-wall carbon nanotubes.

Example 3

Effect of the Catalyst's Drying Conditions

During the temperature increase, the catalytic support progressively passes through several chemical and textural structures, modifying its apparent density. The iron and cobalt salts are also transformed into oxides.

theoretical apparent density of $Al(OH)_3$: 2.42 $g/cm^3$ theoretical apparent density of $Al_2O_3.3H_2O$: 2.53 $g/cm^3$ theoretical apparent density of $Al_2O_3.H_2O$: 3.014 $g/cm^3$ theoretical apparent density of $Al_2O_3$: 3.965 $g/cm^3$ The samples that were subjected to different drying methods were designated in the following manner:

MWA040122: Fe—Co/$Al(OH)_3$ catalyst dried in an oven at atmospheric pressure and at 120° C. for 12 hrs;

MWA ring 5: Fe—Co/$Al(OH)_3$ catalyst dried in the ring dryer at 155° C. (=$T_{in}$). From this point, the exit temperature, $T_{out}$, is equal to 86° C.;

MWA ring 7: Fe—Co/$Al(OH)_3$ catalyst dried in the ring dryer at 185° C. (=$T_{in}$). From this point, the exit temperature, $T_{out}$, is equal to 97° C.

In general terms, it is noted that the textural properties of the Fe—Co/$Al(OH)_3$ catalyst are affected by the type of drying. Thus, rapid drying with a ring dryer which allows 1 kg of damp catalyst to be dried in 9 minutes, produces a drier catalyst with a water residue lower than 2% compared with 5% residual water content for a drying in an oven at 120° C.

Similarly, after a period of 10 min. at 700° C. under nitrogen, the apparent density of the catalysts dried with a ring dryer is very close to the value of the apparent density of dehydrated alumina (3.965 $g/cm^3$).

The specific surface area ($S_{BET}$) developed by catalysts dried with a ring dryer is slightly higher, which might be the consequence of greater evaporation of the residual water, thus freeing up additional micropores (pores with a size lower than 2 nm) and mesopores (pores with a size between 2 and 50 nm).

The textural properties of the Fe—Co/$Al(OH)_3$ catalyst dried under different conditions are analysed in the following manner.

Nitrogen Adsorption/Desorption (BET Analysis)

This technique allows to verify the existence of micropores (pores with a size <2 nm) and mesopores (2 nm<size of pores <20 nm) present in the catalytic support, which in our case is $Al(OH)_3$ for the dried catalyst (dried MWA) and $Al_2O_3$ for the catalyst that remained for 10 min. under nitrogen at 700° C. (white MWA).

It was observed that the porosity of the $Al(OH)_3$ support is very low ($S_{BET}$<10 $m^2/g$). During treatment at 700° C. for 10 min., the specific surface area is greatly increased since the micropores and mesopores are freed of the residual water retained after drying in an oven at 120° C. for one night. Thus, the inventor shows that the treatment stage of 10 minutes is crucial for obtaining a large porous texture of the $Al_2O_3$ catalytic support.

Mercury Porosimetry

This technique allows to verify the existence of large mesopores (20 nm<size of pores <50 nm) and macropores (size of pores >50 nm) present on the catalytic support, which in our case is $Al(OH)_3$ for the dried catalyst (dried MWA) and $Al_2O_3$ for the catalyst that remained for 10 min. under nitrogen at 700° C. (white MWA).

It was noted that the porous volumes are very low (<0.2 cm$^3$/g), which indicates the absence of very large pores (macropores). A slight increase in porous volume was also noted between the dried catalyst and the white catalyst. In fact, the Al$_2$O$_3$ catalytic support is formed from 300° C.-400° C. upwards during the dehydration of Al(OH)$_3$, thus freeing up some large mesopores.

Transmission Electron Microscopy

Figure 5:
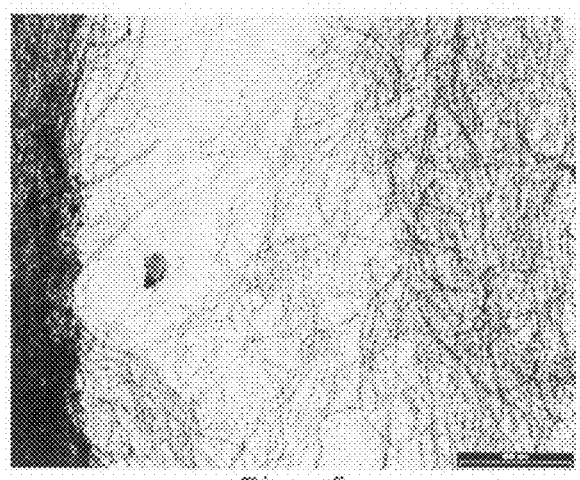
FIG. 5 shows nanotubes synthesised on an Fe—Co/$Al_2O_3$ catalyst dried in a ring dryer at 155° C.

FIG. 5 shows a white MWA sample magnified 500,000 times.

The Al$_2$O$_3$ support is well crystallised with a crystallite diameter in the range of 7 to 12 nm. These crystallites conglomerate to form small layered aggregates with a size that varies from 0.5 to 1 μm. On the surface of the support crystallites, darker particles are observed and are the active sites composed of CoO, FeO and mixed Fe—Co oxides (according to the XRD diffractograms). Their sizes vary from 3 to 9 nm (TEM and XRD data).

TABLE 5

Effect of drying on the textural properties of the catalysts

| Catalyst | Macroscopic density (g/cm$^3$) ± 0.1 | Apparent density (g/cm$^3$) ± 0.1 | S$_{BET}$ (m$^2$/g) ± 10 |
|---|---|---|---|
| Dried MWA 040122 | 1.1 | 2.43 | <10 |
| Dried MWA ring 5 | 1.0 | 2.51 | <10 |
| Dried MWA ring 7 | 1.0 | 2.49 | <10 |
| White*MWA 040122 | 0.8 | 3.21 | 250 |
| White*MWA ring 5 | 1.0 | 3.65 | 310 |
| White*MWA ring 7 | 1.1 | 3.82 | 300 |

Table 5 shows the effect of drying on the textural properties of the catalysts. The macroscopic density is measured by gravimetry, that is the specific mass of the material taking into account the accessible and inaccessible pores as well as the voids between the particles inside the material. The apparent density is determined by helium pycnometry, that is the specific mass of the material including the closed and inaccessible pores of the material. The specific surface area of the material (S$_{BET}$) is determined by adsorption-desorption of nitrogen at 77K.

Activity and Selectivity of the Catalysts

The three dried Fe—Co/Al(OH)$_3$ catalysts are tested in the discontinuous reactor for synthesising multi-wall carbon nanotubes according to the following procedure:

1. 10.0 g of catalyst are distributed in the central zone of a large container;
2. The container is placed in the cold zone of the discontinuous reactor;
3. A 4-minute flush is performed under N$_2$;
4. The container is brought to the hot zone (700° C.) of the oven;
5. The catalyst is treated for 10 min. under N$_2$ (2 l/min.) at 700° C.;
6. A flow rate of C$_2$H$_4$ of 4 l/min. is provided for 20 minutes;
7. A 10-minute flush is performed under N$_2$ (2 l/min.) in the cold zone of the discontinuous reactor.

The out-coming product is weighed and the production yield is calculated according to the equation previously described.

TABLE 6

Nanotube yield with the different dried catalysts

| Catalyst | Yield (%) ± 5% | Quality of the NTs |
|---|---|---|
| Dried MWA 040122 | 395 | Good MWNTs (see photo*) |
| Dried MWA ring 5 | 625 | Good MWNTs (see photo*) |
| Dried MWA ring 7 | 575 | Good MWNTs |

MWNTs = multi-wall nanotubes

Table 6 shows the yield of the different catalysts. It is noted that the yields of the catalysts dried in the ring dryer (MWA ring 5 and MWA ring 7) are clearly higher (625% and 575%) than those obtained with the catalyst that was dried in the oven (395%).

Figure 6:
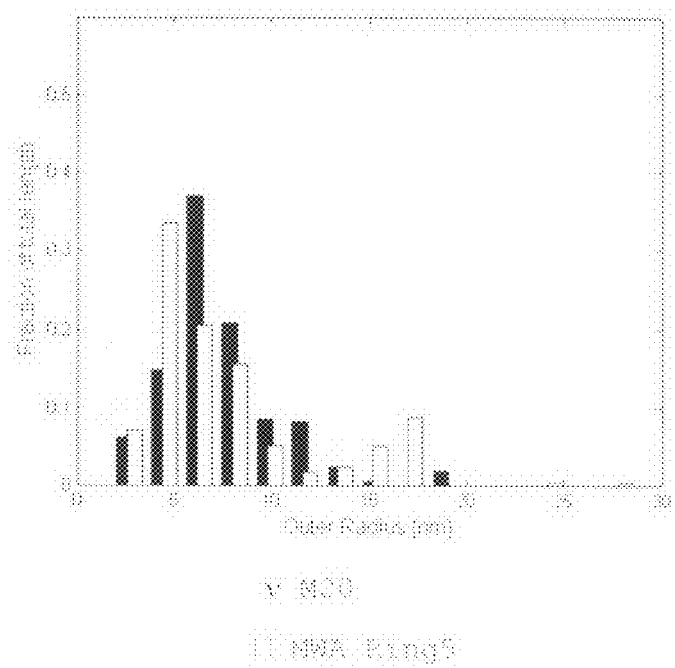
FIG. 6 shows the distribution of the diameters of the carbon nanotubes as a function of the fraction of the total length.

FIGS. 5 and 6 show nanotubes synthesised on an Fe—Co/Al$_2$O$_3$ catalyst dried in an oven at 120° C. and in a ring dryer at 155° C. respectively.

Figure 7:
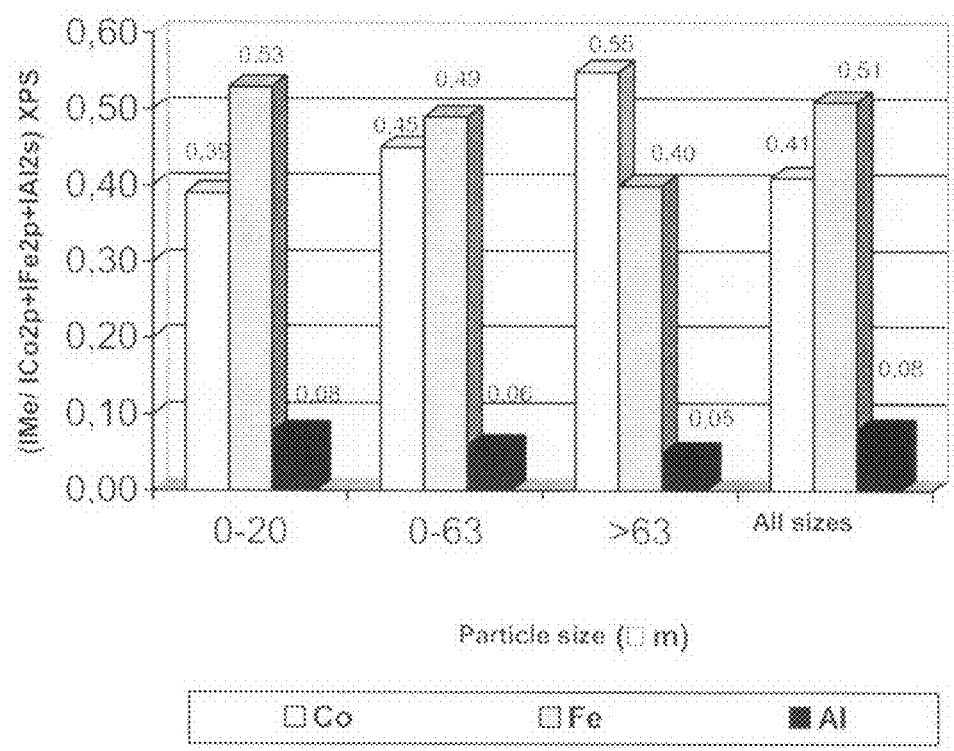
FIG. 7 shows the intensities of the relative signals (IMe/ICo2p+IFe2p+I Al2S) obtained by X-ray photoelectron spectroscopy (XPS) as a function of the particle size of the catalyst.

The type of drying does not affect the quality of the multi-wall carbon nanotubes at all. On the contrary, the distribution of the diameters of the nanotubes synthesised from "MWA ring 5" and "MWA ring 7" samples is more homogeneous than for the catalyst dried in the "MWA 040122" oven. This is shown in FIG. 7.

The type of drying (whether in an oven or with a ring dryer) thus very greatly affects the macroscopic appearance of the catalyst. Indeed, the catalyst dried in the oven at 120° C. is in the form of lumps that are then milled in a mixer in order to obtain a homogeneous powder that can be uniformly deposited in the reactor for synthesising carbon nanotubes. During the drying stage in the ring dryer, the dried catalyst is already in the form of a very fine and homogeneous powder. It was therefore established that the external particle size of the catalyst affects the production yield of multi-wall carbon nanotubes without affecting their quality.

Example 4

Importance of the Sequence of the Preparation Stages, and in Particular of the Impregnation Stage Given the differences in yields of carbon nanotubes observed as a function of the particle size of the catalyst in Example 1, the aluminium hydroxide was milled and sieved to different particle sizes before it is impregnated with the metallic salt solutions. This is a preferred embodiment of the present invention.

Table 7 shows the results of the synthesis of carbon nanotubes obtained with the catalysts prepared from the milled and sieved Al(OH)$_3$ support. A great increase in the yield of carbon nanotubes may be noted compared with the alumina impregnated before milling and sieving (Example 1). In this case, particles with a size <63 μm have the same percentage yield of carbon nanotubes (1,030%).

Synthesis Conditions:

C$_2$H$_4$ flow rate: 4 l/min.

Synthesis time: 20 min.

Temperature: 700° C.

Contact time of C$_2$H$_4$ (M/F): 0.9 g.h/mol

TABLE 7

Results of the synthesis of carbon nanotubes
obtained with catalysts prepared from the Al(OH)$_3$
support, milled and sieved before impregnation

| Property | <20 µm | 0-63 µm | >63 µm | All sizes |
|---|---|---|---|---|
| % yield of nanotubes | 1,032 | 1,021 | 816 | 390 |
| mol C (nanotube)/mol C (C$_2$H$_4$) | 0.39 | 0.39 | 0.31 | 0.16 |
| Relative yield | 2.7 | 2.6 | 2.1 | 1.0 |

Tables 3 and 7 also show the variation in the yield percentage of carbon nanotubes as a function of the particle size of the catalyst relative to all the particle sizes for the samples prepared in Examples 1 and 2. It may be noted that the preferred method of preparation of the invention (Example 3) increases the nanotube yield by a factor of about 2.7 whereas the small particles (<20 µm) in the catalyst prepared according to the prior art show a relative yield of 2.0 compared with all the particle sizes.

The small particles have a greater external surface area than the large particles, and for this reason differences of chemical composition may be expected depending on the particle sizes of the solid. In fact, analyses by X-ray photoelectron spectroscopy (XPS) carried out on various samples (FIG. 7) reveal differences in composition and dispersion state over the surface of the supported phases of Co and Fe depending on the particle size of the catalyst.

Moreover, the synthesis of carbon nanotubes is an endothermic reaction and is thus favoured by high temperatures. For this reason, the reaction is affected by phenomena of transfer of mass and temperature in the catalyst and by the thermal conductivity of the particles of the catalyst. The literature shows that the thermal conductivity of an aluminium hydroxide, depending on the temperature and medium (vacuum, air, helium), increases as the macroporosity of the material and the spaces between the particles decrease.

These two simultaneous effects may explain the behaviour of the carbon nanotube synthesis as a function of the particle size distribution.

GENERAL CONCLUSIONS

It turns out that the particle size of the Fe—Co/Al(OH)$_3$ catalyst very greatly affects the production yield of multi-wall nanotubes without affecting their quality. Thus, the production yield of nanotubes increases as the external size of the catalyst particles decreases. Moreover, the size distribution of the multi-wall nanotubes seems to be more monodispersed as the external size of the catalyst particles decreases.

By comparison with the results obtained in the prior art, it is observed that the use of Fe—Co/Al(OH)$_3$ catalysts with a finer initial particle size allows to synthesize multi-wall carbon nanotubes with dimensions of external diameters distributed more tightly around average. These averages are equal to 6.8 nm for the dried MWA ring 5 sample and 7.1 nm for the M 20 sample (particle size lower than 20 µm). Moreover, the percentage of amorphous carbon obtained is virtually zero.

The impregnation of the milled and sieved support with a particle size lower than 63 µm with the Fe and Co solution allows to obtain catalysts with a very high performance with regard to the production of carbon nanotubes.

The invention claimed is:

1. A method for synthesising a supported catalyst with a view to the production of multi-wall carbon nanotubes comprising the following stages:
    mixing an Al(OH)$_3$ powder having a particle size lower than about 80 µm with an aqueous solution of an iron and cobalt salt, the whole forming a paste;
    drying said paste until a powder with a moisture level lower than about 5% by weight is obtained;
    selecting the particle-size fraction of said supported catalyst that is lower than about 63 µm; and
    producing nanotubes using the supported catalyst having a particle size lower than about 63 µm.

2. Method as in claim 1, wherein the Al(OH)$_3$ powder chosen at the start—has a particle size lower than about 70 µm and a specific surface area lower than about 10 m$^2$/g.

3. Method as in claim 1, wherein the Al(OH)$_3$ powder is chosen from gibbsite or bayerite.

4. Method as in claim 1, wherein the Al(OH)$_3$ powder is bayerite.

5. Method as in claim 1, wherein the aqueous solution of said iron and cobalt salt is a solution of Fc(NO$_3$)$_3$ and Co(OAc)$_2$.

6. Method as in claim 5, wherein the Fe(NO$_3$)$_3$ and Co(OAc)$_2$ have a purity between about 95 and about 99%.

7. Method as in claim 1, wherein the drying stage is carried out in a dryer, in an oven or by lyophilisation.

8. Method as in claim 1, wherein the stage for selecting the particle-size fraction is preceded by a milling stage.

9. Method as in claim 8, wherein said selection is performed by sieving.

10. Method as in claim 1, wherein the mixing, drying and selection stages are carried out consecutively.

11. Method as in claim 1, wherein an additional milling and selection stage precedes the mixing stage.

12. A method for producing multi-wall nanotubes comprising the following successive stages:
    producing a supported catalyst according to the method of claim 1;
    prior treatment of the supported catalyst having a particle size lower than about 70 µm at a temperature of about 700° C. in an oven to obtain an activated supported catalyst;
    putting a flow of pure methane and/or ethylene in the presence of said activated catalyst at a temperature between about 650 and about 750° C. for about 15 to about 25 minutes in the oven.

13. Production method as in claim 12, wherein the contact time between the activated supported catalyst and the gas is about 0.8 to about 1.8 (M/F).

14. The method as in claim 1, further comprising using the supported catalyst for producing single and multi-wall carbon nanotubes.

15. A method of producing multi-wall carbon nanotubes, comprising steps of:
    synthesizing a supported catalyst, wherein synthesizing comprises steps of:
        providing an Al(OH)$_3$ powder having a particle size lower than about 80 µm;
        mixing the Al(OH)$_3$ powder with an aqueous solution of an iron and cobalt salt to form a paste;
        drying the paste to obtain a powder having a moisture level lower than about 5% by weight;
        selecting a portion of the powder to obtain a supported catalyst having a particle size less than about 70 µm;

treating the supported catalyst prior to nanotube synthesizing at a temperature of about 700° C. in presence of a nitrogen flow to obtain an activated support catalyst; and synthesizing multi-wall carbon nanotubes with a continuous flow of ethylene at a flow rate between about 180-240 L/h to contact the activated support catalyst at a temperature between about 650° C. and about 750° C. for about 15 to 25 minutes.

16. The method of claim 15, wherein providing a $Al(OH)_3$ comprises selecting a $Al(OH)_3$ powder having a particle size lower than about 80 μm, a specific surface area and a porous volume lower than about 20 $m^2/g$ and about 0.5 cc/g.

17. The method of claim 16, wherein providing a $Al(OH)_3$ further comprises milling and sieving the $Al(OH)_3$ powder to a particle size lower than about 70 μm.

18. The method of claim 15, wherein the paste is dried in a ring dryer at about above 150° C. to obtain a powder having a moisture level less than about 2% by weight.

19. The method of claim 17, wherein the supported catalyst powder is selected to a particle size lower than about 63 μm, and the flow of ethylene at a flow rate of about 240 l/h is introduced for a synthesis time of about 20 min, and a contact time of about 0.9 g·h/mol at about 700° C. to obtain the carbon nanotubes at about 1000% yield.

\* \* \* \* \*